US008948985B2

(12) United States Patent
Sakamoto et al.

(10) Patent No.: US 8,948,985 B2
(45) Date of Patent: Feb. 3, 2015

(54) SHIFT CONTROL DEVICE FOR MOTORCYCLE, AND MOTORCYCLE INCORPORATING SAME

(71) Applicant: Honda Motor Co., Ltd., Minato-Ku, Tokyo (JP)

(72) Inventors: Naoki Sakamoto, Wako (JP); Kenichi Machida, Wako (JP); Makoto Tsuyuguchi, Wako (JP); Satoru Okoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 13/669,883

(22) Filed: Nov. 6, 2012

(65) Prior Publication Data
US 2013/0133457 A1 May 30, 2013

(30) Foreign Application Priority Data
Nov. 25, 2011 (JP) ................................ 2011-257497

(51) Int. Cl.
*G06F 7/00* (2006.01)
*F16H 61/688* (2006.01)
*B60W 10/11* (2012.01)

(52) U.S. Cl.
CPC ............. *F16H 61/688* (2013.01); *B60W 10/11* (2013.01)
USPC ........................... 701/52; 74/473.12; 477/156

(58) Field of Classification Search
CPC ....... F16H 61/688; F16H 61/16; F16H 63/18; B60W 10/11

USPC ........ 701/51, 52, 55, 56, 66, 67; 74/330, 331, 74/335, 473.12, 473.1, 473.21; 477/156, 477/70, 5, 115, 161; 200/61.88; 180/230
See application file for complete search history.

(56) References Cited

U.S. PATENT DOCUMENTS

| | | | |
|---|---|---|---|
| 6,394,214 B1 * | 5/2002 | Hahm ........................... | 180/230 |
| 8,229,637 B2 * | 7/2012 | Kobayashi et al. ............. | 701/66 |
| 2002/0027031 A1 * | 3/2002 | Miyata .......................... | 180/219 |
| 2004/0093974 A1 * | 5/2004 | Nesseth ..................... | 74/473.12 |
| 2006/0124373 A1 * | 6/2006 | Abraham ..................... | 180/230 |
| 2008/0161155 A1 * | 7/2008 | Suzuki et al. .................. | 477/98 |
| 2008/0314173 A1 * | 12/2008 | Honma .............................. | 74/54 |
| 2009/0132133 A1 * | 5/2009 | Kojima et al. .................. | 701/52 |
| 2009/0292432 A1 * | 11/2009 | Suzuki et al. ................... | 701/68 |
| 2010/0087995 A1 * | 4/2010 | Arai ................................. | 701/54 |
| 2010/0270135 A1 * | 10/2010 | Murasawa et al. ......... | 200/61.88 |

FOREIGN PATENT DOCUMENTS

JP 2006-292066 A 10/2006

* cited by examiner

*Primary Examiner* — Helal A Algahaim
*Assistant Examiner* — Shardul Patel
(74) *Attorney, Agent, or Firm* — Carrier Blackman & Associates, P.C.; Joseph P. Carrier; William D. Blackman

(57) ABSTRACT

A shift control device for a motorcycle includes a transmission that allows switching between a neutral state and a number of engaged shift positions, a shift control section that controls a shift state of the transmission, and an N/D changeover switch that switches between the neutral state and a drive mode for executing automatic shift among the plural shift positions. The shift control device also includes a hand-operated shift switch that allows manual shifting among the plural shift positions, and a foot operated shift control unit that allows manual shifting among the plural shift positions during the drive mode according to an operation of a shift pedal. The N/D changeover switch and the hand-operated shift switch are arranged around a handlebar of the motorcycle. The shift control section is operable to switch between the neutral state and the drive mode by the foot operated shift control unit.

19 Claims, 14 Drawing Sheets

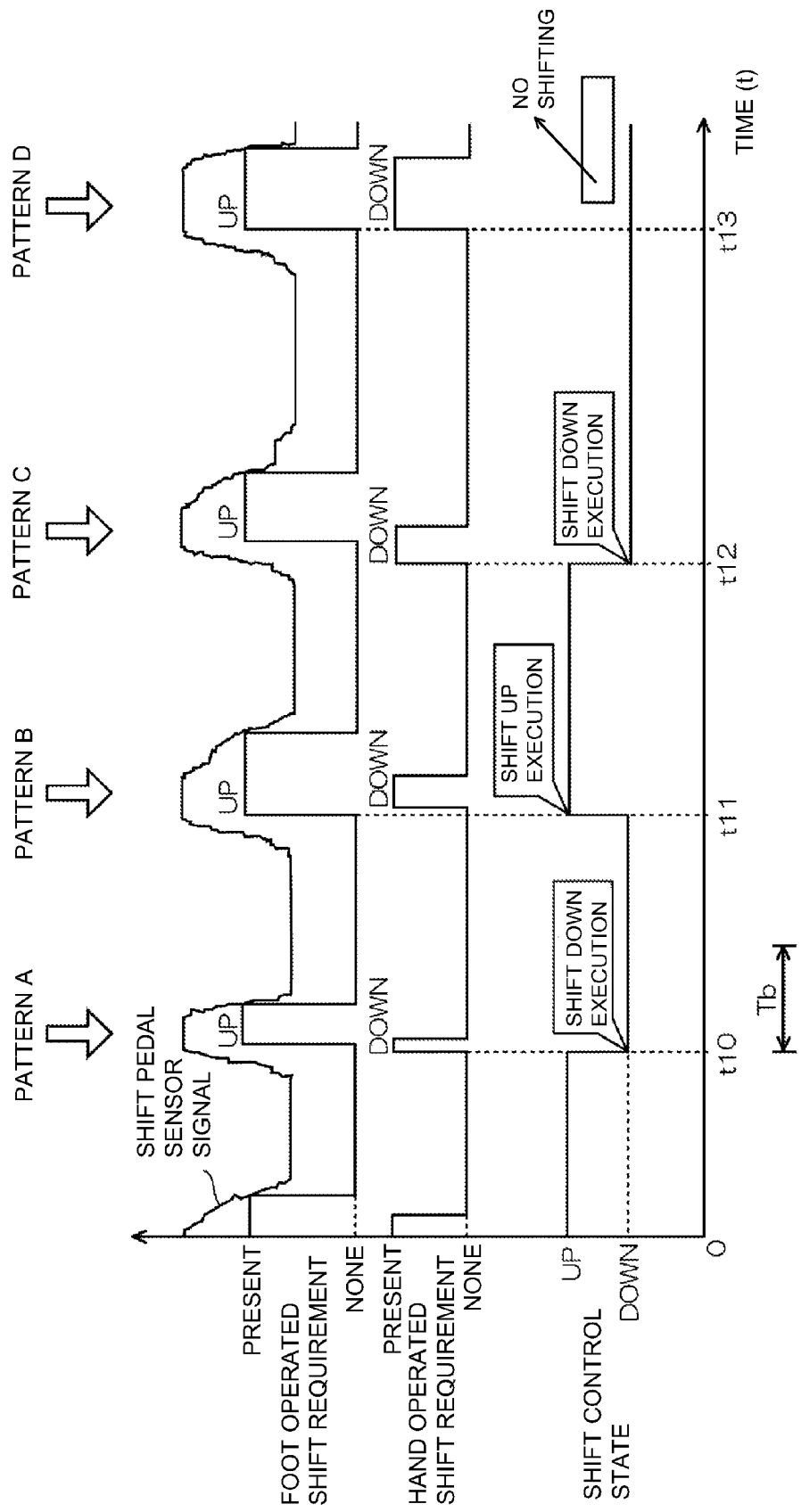

SHIFT CONTROL DEVICE FOR MOTORCYCLE, AND MOTORCYCLE INCORPORATING SAME

CROSS-REFERENCE TO RELATED APPLICATIONS

The present invention claims priority under 35 USC 119 based on Japanese patent application No. 2011-257497, filed on Nov. 25, 2011. The entire subject matter of this priority document, including specification claims and drawings thereof, is incorporated by reference herein.

BACKGROUND OF THE INVENTION

1. Field of the Invention

The present invention relates to a shift control device for a motorcycle, and to a motorcycle incorporating the same. More particularly, the present invention relates to a shift control device for a motorcycle provided with a separate shift switch in each of a handlebar and a foot pedal, and to a motorcycle incorporating the same.

2. Description of the Background Art

There is a known shift control device for a vehicle, which is configured such that, when a state of an automatic transmission is switched from neutral to a drive mode by operation of a shift lever arranged in the vehicle, automatic shift is executed according to the traveling state in the drive mode, and by being switched further from the drive mode to a manual shift mode, the manual shift (semi-automatic shift) by operation of shift lever is allowed.

In the Japanese Patent Document JP-A No. 2006-292066, a constitution is disclosed according to which, in a shift control device for a four-wheeled vehicle, one shift lever allowing switching between neutral and a drive mode and shifting of the shift gear stage is erectingly arranged on a floor at a side of a driver's seat.

However, in the constitution described in the Japanese Patent Document JP-A No. 2006-292066, although switching operation of various shift states is allowed by one shift lever, a large and complicated mechanism allowing to change the position of the shift lever front-back and right-left is required. Accordingly, when the shift function described above was to be applied to a motorcycle, it was necessary to arrange a neutral/drive mode (N/D) changeover switch for switching between neutral and a drive mode and a hand operated shift switch for changing the shift gear stage around a handlebar and the like separately.

On the other hand, because it is common to execute shift operation of a motorcycle by a foot pedal, a constitution to provide a foot pedal as a shift switch to allow foot operated shift is conceivable. However there was a problem in that, as far as the foot operated shift was allowed only, two-stage operation of switching the shift gear stage by the foot pedal after hand operated switching from neutral to a drive mode by the N/D changeover switch was required which was different from ordinary foot pedal operation.

The present invention overcomes the drawbacks of the prior art described above. Accordingly, it is one of the objects of the present invention to provide a shift control device for a motorcycle allowing operation without a sense of incongruity and easy to use even when a foot operated shift switch by a foot pedal is further provided in one arranged with an N/D changeover switch and a hand operated shift switch around a handlebar of a motorcycle.

SUMMARY OF THE INVENTION

In order to achieve the above objects, the present invention according to a first feature thereof provides a shift control device for a motorcycle including: a transmission (TM) that allows switching among a neutral state and a plural shift positions; a shift control section (132) that controls a shift state of the transmission (TM); an N/D changeover switch (85) that switches between the neutral state and a drive mode for executing automatic shift among the plural shift positions; and a hand operated shift switch (97) that allows manual shifting among the plural shift positions by operation during the drive mode, the N/D changeover switch (85) and the hand operated shift switch (97) being arranged around a handlebar of the motorcycle (1), and a foot operated shift control unit (95) that allows manual shifting between the plural shift positions and the neutral state during the drive mode according to operation of a foot pedal (7), wherein the shift control section (132) is set so as to switch between the neutral state and the drive mode by the foot operated shift control unit (95).

Next, the second feature of the present invention is that the foot pedal (7) is constituted so as to allow a turning motion from a neutral position to one side and the other side, and the shift control section (132) permits switching between the neutral state and the drive mode by the foot operated shift control unit (95) when vehicle speed is equal to a predetermined vehicle speed (VR1, VR2) or below.

The third feature of the present invention is that the shift control section (132) permits switching from the drive mode to the neutral state when vehicle speed is equal to a first vehicle speed (VR1) or below, the first vehicle speed (VR1) being a first predetermined vehicle speed, and permits switching from the neutral state to the drive mode when vehicle speed is equal to a second vehicle speed (VR2) or blow, the second vehicle speed (VR2) being a second predetermined vehicle speed higher than the first vehicle speed (VR1).

Further, the fourth feature of the present invention is that the shift control section (132) determines whether or not a hand operated shift requirement of shift up or shift down has been fixed based on operation of the hand operated shift switch (97), determines whether or not a foot operated shift requirement of shift up or shift down has been fixed based on operation of the foot operated shift control unit (95), and executes shift control based on a shift requirement fixed earlier out of the hand operated shift requirement or the foot operated shift requirement.

Next, the fifth feature of the present invention is that the shift control section (132) delays acceptance of a next shift requirement for a constant time (also referred to as a predetermined time period) (Tb) after the hand operated shift requirement or the foot operated shift requirement is fixed.

Further, the sixth feature of the present invention is that, when the hand operated shift requirement and the foot operated shift requirement are fixed at the same timing and both of the shift requirements are common in shift up or shift down, the shift control section (132) executes shift control according to the shift requirement.

Next, the seventh feature of the present invention is that the shift control section (132) is set to cancel, when the hand operated shift requirement and the foot operated shift requirement are fixed at the same timing and both of the shift requirements are different from each other in shift up and shift down, both of the shift requirements fixed.

Further, the eighth feature of the present invention is that the shift control section (132) fixes the hand operated shift requirement by that the hand operated shift switch (97) is pressingly operated continuously for a predetermined time (Ta).

Next, the ninth feature of the present invention is that a foot pedal (7) and a shift pedal sensor (44) that detects a turning angle of the foot pedal (7) are included in the foot operated shift control unit (95), and the shift control section (132) fixes the foot operated shift requirement by that an output signal of the shift pedal sensor (44) falls within a range of a preset input signal pattern (P).

Further, the tenth feature of the present invention is that the preset input signal pattern (P) includes a generally triangle section (P1) corresponding to a period when the foot pedal (7) is in turning motion, and a generally rectangular section (P2) corresponding to a period until a predetermined time passes after the foot pedal (7) bumps on a turning limit position.

Furthermore, the eleventh feature of the present invention is that the hand operated shift switch (97) includes a shift-up switch (67) and a shift-down switch (68) of an on-off type arranged in a handlebar switch (64) of the motorcycle (1), and the shift pedal sensor (44) of the foot operated shift control unit (95) includes a potentiometer that detects a turning angle of the foot pedal (7).

Advantageous Effects of the Invention

According to the first feature, when shifting is to be operated by hand, the N/D changeover switch is to be operated to effect the drive state to allow automatic shift, then the hand operated shift switch is to be operated to allow manual shift. Further, the foot operated shift control unit allows the manual shift between the plural shift positions and the neutral state during the drive mode according to operation of the foot pedal, because the shift control section is set so as to switch between the neutral state and the drive mode by the foot operated shift control unit. It may be noted that switching to the drive mode is not effected even when the hand operated shift switch is operated from the neutral state; whereas when the foot pedal is used, switching to the drive mode is effected by operation of the foot pedal from the neutral state to allow the manual shift by the foot pedal. Therefore, immediate shifting from the neutral state to the drive mode and the foot operated manual shift is allowed without operation of the N/D changeover switch arranged around the handlebar.

In the hand operated shift control switch, the shift position is merely set to UP or DOWN only and shifting to the neutral state is not set ordinarily. However, because the foot operated shift control unit is configured to allow shifting to the neutral position, switching between neutral and the drive mode is allowed by operation by foot utilizing the feature, and shift control matching the feeling of a rider can be provided. Thus, in a shift control device for a motorcycle provided with an N/D changeover switch and a hand operated shift switch in a handlebar, even when a foot operated shift switch by a foot pedal is further arranged, shift operation of switching from a neutral state to a travel allowing state by operation of the foot pedal which is similar to that done in an ordinary motorcycle is allowed, and easiness of use can be improved without imparting a sense of incongruity to the rider.

According to the second feature, the foot pedal is constituted to allow a turning motion from the neutral position to one side and the other side and the shift control section permits switching between the neutral state and the drive mode by the foot operated shift control unit when vehicle speed is equal to a predetermined vehicle speed or below. Therefore, for example, even when the shift control device is constituted to allow to execute not only switching among respective shift positions but also switching operation between the neutral state and the drive mode by turning operation of the foot pedal to the up side or the down side (stepping-down or pushing-up motion by a toe), switching from the drive mode to the neutral state in a high speed state is prevented, and shift control suitable to a traveling state can be executed.

According to the third feature, the shift control section permits switching from the drive mode to the neutral state when the vehicle speed is a first vehicle speed or below, the first vehicle speed being the predetermined vehicle speed, and permits switching from the neutral state to the drive mode when the vehicle speed is a second vehicle speed or below, the second vehicle speed being the predetermined vehicle speed higher than the first vehicle speed. Therefore, for example, by setting the first vehicle speed to a small value, execution of switching to the neutral state is allowed in a traveling state the motorcycle is highly possible to stop. Also, by setting the second vehicle speed higher than the first vehicle speed, even when the vehicle speed has increased a little in the neutral state in starting on a downward slope and the like for example, smooth switching to the drive mode is allowed.

According to the fourth feature, the shift control section determines whether or not the hand operated shift requirement of shift up or shift down has been fixed based on operation of the hand operated shift switch, determines whether or not the foot operated shift requirement of shift up or shift down has been fixed based on operation of the foot operated shift control unit, executes shift control based on a shift requirement fixed earlier out of the hand operated shift requirement or the foot operated shift requirement. Such constitution of the shift control device can immediately respond to a shift requirement of an occupant.

According to the fifth feature, the shift control section delays acceptance of a next shift requirement for a constant time (predetermined time period) after the hand operated shift requirement or the foot operated shift requirement is fixed. Therefore, the possibility of generating unnecessary torque variation by accepting continuous shift operation within quite a short time can be reduced.

According to the sixth feature, when the hand operated shift requirement and the foot operated shift requirement are fixed at the same timing and both of the shift requirements are common in shift up or shift down, the shift control section executes shift control according to the shift requirement. Therefore, the shift control device of the present invention determines that the intention of a rider of shifting has been fixed, and can execute quick shift control.

According to the seventh feature, the shift control section is set to cancel, when the hand operated shift requirement and the foot operated shift requirement are fixed at the same timing and both of the shift requirements are different from each other in shift up and shift down, both of the shift requirements fixed. Therefore, the shift control section can prevent the shift change not intended by the occupant from being executed when, for example, a vehicle body rocks due to unevenness of a road surface in shifting up by hand operated shift, the occupant unintentionally touches a foot pedal, and executes shift down operation simultaneously and the like.

According to the eighth feature, the shift control section fixes the hand operated shift requirement by that the hand operated shift switch is pressingly operated continuously for a predetermined time. Therefore, the effect of an abrupt motion, noise and the like on determination on fixing the shift requirement can be reduced.

According to the ninth feature, the foot pedal and a shift pedal sensor that detects a turning angle of the foot pedal are included in the foot operated shift control unit, the shift control section fixes the foot operated shift requirement by that an output signal of the shift pedal sensor falls within a range of a preset input signal pattern. Therefore, the effect of noise and the like on fixing the foot operated shift requirement can be reduced.

According to the tenth feature, the preset input signal pattern includes a substantially triangle section corresponding to a time period when the foot pedal is in turning motion, and a substantially rectangular section corresponding to a period until a predetermined time passes after the foot pedal bumps on a turning limit position. Therefore, the foot operated shift requirement can be detected easily and appropriately.

According to the eleventh feature, the hand operated shift switch includes a shift-up switch and a shift-down switch of an on-off type arranged in a handlebar switch of the motorcycle, and the shift pedal sensor of the foot operated shift control unit includes a potentiometer that detects a turning angle of the foot pedal. Therefore switch output is obtained using a different method between the hand operated shift switch operated by the fingers of the hand and the foot pedal side operated by the toe in a state of putting on a shoe, and detection of the shift requirement according to the characteristic of the hand operated shift and the foot operated shift is allowed.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 15 is a time chart showing the relation between a foot operated shift requirement and a hand operated shift requirement.

DETAILED DESCRIPTION OF ILLUSTRATIVE EMBODIMENTS

An illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
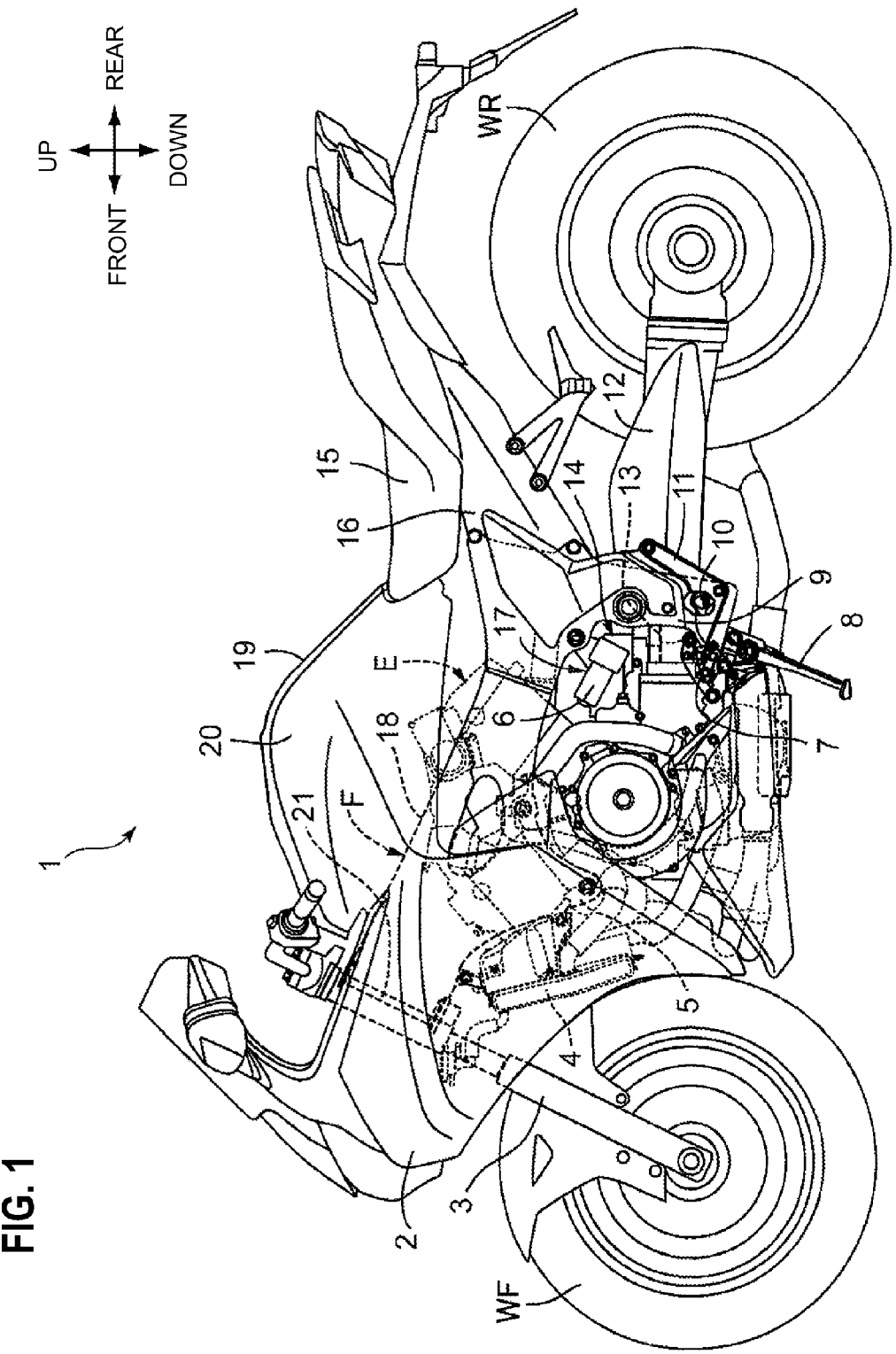
FIG. 1 is a left side view of a motorcycle to which a shift control device in relation with an illustrative embodiment of the present invention is applied.
Figure 2:
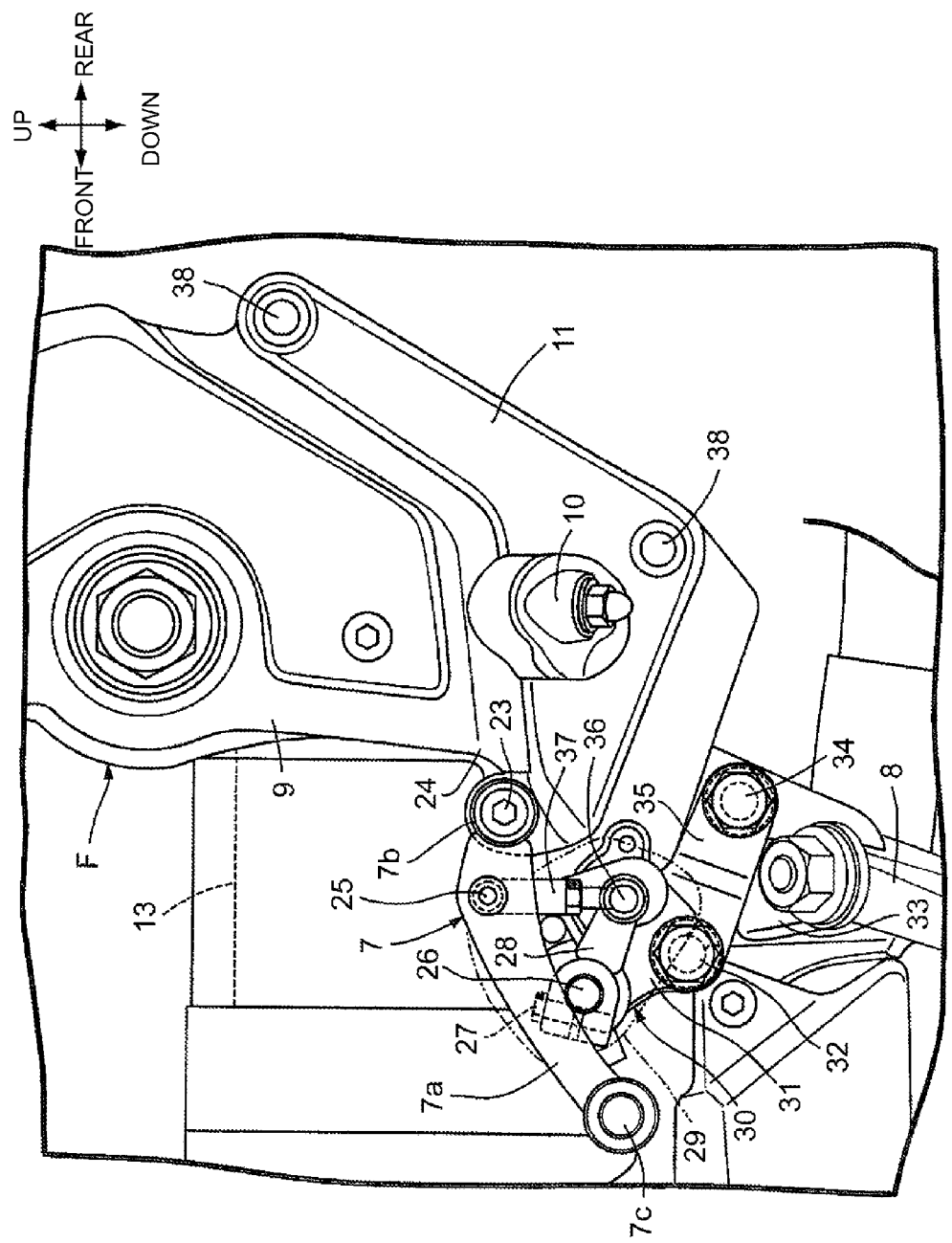
FIG. 2 is a partial enlarged view around a shift pedal.

FIG. 1 is a left side view of a motorcycle 1 to which a shift control device in relation with an illustrative embodiment of the present invention is applied. FIG. 2 is a partial enlarged view around a shift pedal. A vehicle body frame F of the motorcycle 1 includes a head pipe 21 steerably supporting front forks 3 to which a front wheel WF is journaled, a pair of right and left main frames 18 extending rear downward from the head pipe 21, and a pair of right and left pivot frames 9 connected to the rear parts of both the main frames 8 and extending downward. An engine hanger 5 extending downward from their middle parts is integrally connected to the main frames 18. Also, a rear wheel WR is journaled to the rear part of a swing arm 12 whose front end is swingably supported by the pivot frames 9.

An engine body 14 of a water-cooled engine E is arranged below the main frames 18. The engine body 14 is suspended from lower parts of the engine hanger 5, the main frames 18 and the pivot frames 9. Rotary power outputted from the engine E is transmitted to the rear wheel WR through a drive shaft 13 extending in the front-back direction and passing inside the swing arm 12.

Above the main frames 18, a fuel tank 19 is mounted, and a riding seat 15 is arranged behind the fuel tank 19. A rear cover is disposed behind the seat 15. A part of the vehicle body frame F and a part of the engine E are covered by a cowling 2. The cowling 2 includes a tank cover 20 covering the major part of the fuel tank 19 from sides.

A radiator 4 is arranged in front of the engine body 14. A shift actuator 17 turning a shift drum 114 (FIG. 7) by rotary power of a shift control motor 6 is arranged on a left side surface of the engine body 14.

Figure 3:
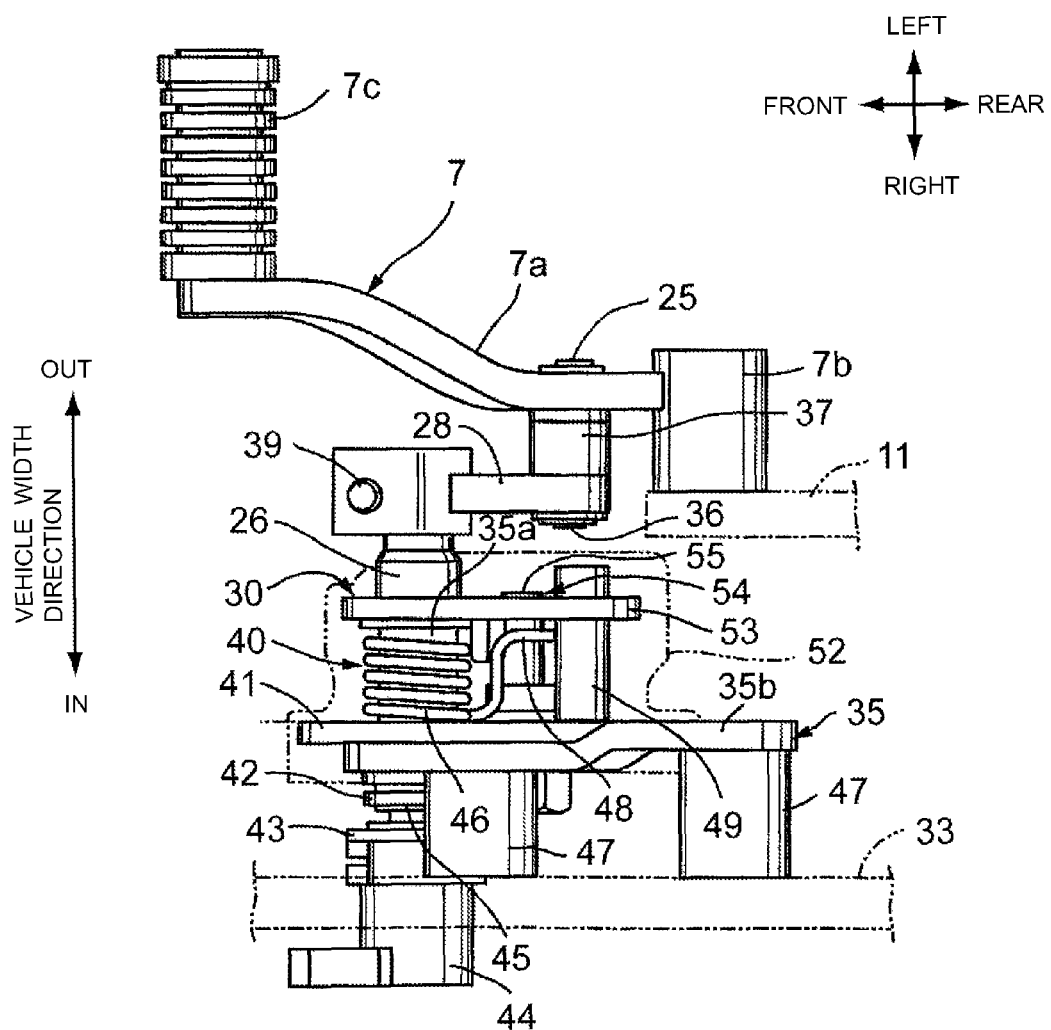
FIG. 3 is an enlarged view of a shift mechanism.

With reference to FIGS. 2-3, a step holder 11 provided with a step 10 on which a left foot of an occupant is placed is attached by two bolts 38 to a lower part of the left pivot frame 9 constituting a part of the vehicle body frame F. A shift pedal 7 as a foot pedal capable of turning operation on the toe side of the left foot placed on the step 10 is turnably journaled to the step holder 11. The shift pedal 7 includes an arm part 7a extending in the front-back direction, a cylindrical supported part 7b arranged at the rear end of the arm part 7a, and a step part 7c arranged at the distal end of the arm part 7a. The supported part 7b is turnably supported by the front end of the step holder 11 through a support shaft 23 oriented in the vehicle width direction.

Because the step 10 is arranged in the step holder 11 at a position corresponding to a generally center part along the front-back direction of the pivot frame 9 and the shift pedal 7 is extended forward from the front end of the step holder 11, a front lower part of the left pivot frame 9 constitutes a foot restricting part 24 that restricts movement of the left foot of a driver placed on the shift pedal 7 inward in the vehicle width direction.

A side stand bracket 33 constituting a part of the vehicle body frame F is fixedly attached to a lower part of the pivot frame 9 on the left side in the vehicle width direction. A side stand 8 allowing the motorcycle 1 to park in a state inclined to the left side is turnably attached to the side stand bracket 33.

A support member 35 arranged on the inner side in the vehicle width direction of the left pivot frame 9 is attached to the side stand bracket 33. The support member 35 includes a movable plate 53 as a movable member interlocked with the shift pedal 7, and supports a movable part 30 including a stopper mechanism 54 restricting a turning operation range of the shift pedal 7 and a return mechanism 40. The movable part 30 is arranged below the drive shaft 13.

The support member 35 is formed so as to integrally include a cylindrical support tube part 35a forming a support hole (not shown) having an axial line extending in the vehicle width direction and a support plate part 35b protruding sideways from a part closer to the inner end along the vehicle width direction of the support tube part 35a. Cylindrical spacers 47 are interposed between an outer side surface of the side stand bracket 33 and the flat plate-like support plate part 35b arranged at an outer lateral side of the side stand bracket 33. The support plate part 35b of the support member 35 is attached to the side stand bracket 33 by a pair of bolts 32, 34 inserted to the respective spacers 47.

Shift operation by the shift pedal 7 is detected by a shift pedal sensor 44. The shift pedal sensor 44 is a resistance type angle sensor (potentiometer). A shift action of a transmission TM (refer to FIG. 7) is controlled based on the detection result of the shift pedal sensor 44. A sensor stay 43 supporting the shift pedal sensor 44 is fastened to the support plate part 35b by a pair of screw members (not shown) so that the shift pedal sensor 44 is arranged in a position leaving a space inward in the vehicle width direction from the support plate part 35b of the support member 35.

With the support hole formed in the support member 35, a turning shaft 26 turning according to operation of the shift pedal 7 turnably meshes. A retaining ring 45 is furnished to a part which is projected from the inner end of the support hole and is an outer periphery of the turning shaft 26 so as to embrace a washer 42 between the part and an inner end of the support tube part 35a. In the turning shaft 26, a flange part embracing the support tube part 35a of the support member 35 is arranged between the turning shaft and the washer 42. Thus, the turning shaft 26 comes to be turnably supported by the support tube part 35a of the support member 35 while keeping an axial direction constant. An end on the inner side in the vehicle width direction of the turning shaft 26 is hermetically stuck into a case of the shift pedal sensor 44, and is connected to a detection shaft of the shift pedal sensor 44.

One end of an arm 28 extending outward in the radial direction of the turning shaft 26 is fastened by a bolt 39 to an end on the outer side in the vehicle width direction of the turning shaft 26. One end of a link rod 37 extending in the vertical direction is turnably connected, through first connecting pin 25 having an axial line parallel to the turning shaft 26, to a middle part of the arm part 7a of the shift pedal 7a. The other end of the arm 28 and the other end of the link rod 37 are turnably connected to each other through a second connecting pin 36 having an axial line parallel to the first connecting pin 25. By turning accompanying turning of the shift pedal 7, the turning of the turning shaft 26 is detected by the shift pedal sensor 44. Therefore, the shift pedal sensor 44 comes to detect shift operation of either shift up or shift down by the shift pedal 7.

The movable part 30 includes the movable plate 53 fixed to the turning shaft 26 and a clip plate 41 fixed to the support member 35 so as to oppose the movable plate 53. In the clip plate 41 formed into a flat plate shape abutting upon the support plate part 35b of the support member 35, an insertion hole through which the support tube part 35a of the support member 35 is inserted and an arc-shape engaging recess allowing one bolt 32 out of the pair of bolts 32, 34 for attaching the support plate part 35b of the support member 35 to the side stand bracket 33 to engage therewith are arranged, and the one bolt 32 comes to attach the clip plate 41 to the side stand bracket 33 along with the support plate part 35b so as to engage with the engaging recess.

The movable plate 53 is fixedly attached to the turning shaft 26, and a cylindrical part 49 having a bottomed accommodation hole that opens to the click plate 41 side and with a distal end part approaching and opposing the click plate 41 is arranged in the movable plate 53. The movable part 30 includes a click mechanism that imparts a sense of clicking to operation of the shift pedal 7. The click mechanism is constituted to include a click ball (not shown) accommodated in a distal end of the accommodation hole and a spring (not shown) energizing the click ball between the spring and the click plate 41.

When the movable plate 53 turns from its neutral position to the shift up side or the shift down side by operation of the shift pedal 7, in the early stage of turning of the movable plate 53, because the click ball climbs a taper part (not shown) while compressing the spring of the click mechanism, operation torque gradually increases. When the turning amount of the movable plate 53 becomes a predetermined amount or more, the operation torque decreases, and therefore an occupant operating the shift pedal 7 by foot can feel a sense of clicking.

Also, the movable part 30 includes the stopper mechanism 54 that restricts the turning operation range of the shift pedal 7. The stopper mechanism 54 is constituted of a stopper pin 55 screwed into and fixed to the support plate part 35b of the support member 35, and a restriction hole arranged in the movable plate 53 so as to allow the stopper pin 55 to be inserted therethrough. With this stopper mechanism 54, a turning range of the movable plate 53 or the shift pedal 7 comes to be restricted to a range where the stopper pin 55 can move within the restriction hole.

Further, the movable part 30 includes the return mechanism 40 that applies a spring force in the returning direction to the shift pedal 7, the return mechanism 40 is configured that a coil-like return spring 46 including grasping pieces 48 grasping an engaging projection integrally arranged in the movable plate 53 so as to project from an edge on the turning shaft 26 side of the restriction hole to the clip plate 41 side and the stopper pin 55 from both sides at both ends is furnished in the support member 35 so as to surround the support tube part 35a of the support member 35, and when the movable plate 53 turns from the neutral position to the shift up side or the shift down side accompanying turning operation of the shift pedal 7, a spring force in a direction the movable plate 53 is returned to a neutral direction which is a direction the shift pedal 7 is returned to a non-operating position comes to be applied from one of both the grasping pieces 48 of the return spring 46 to the movable plate 53. The movable part 30 is covered with a cover 52, and the cover 52 is detachably attached to the click plate 41.

Figure 4:
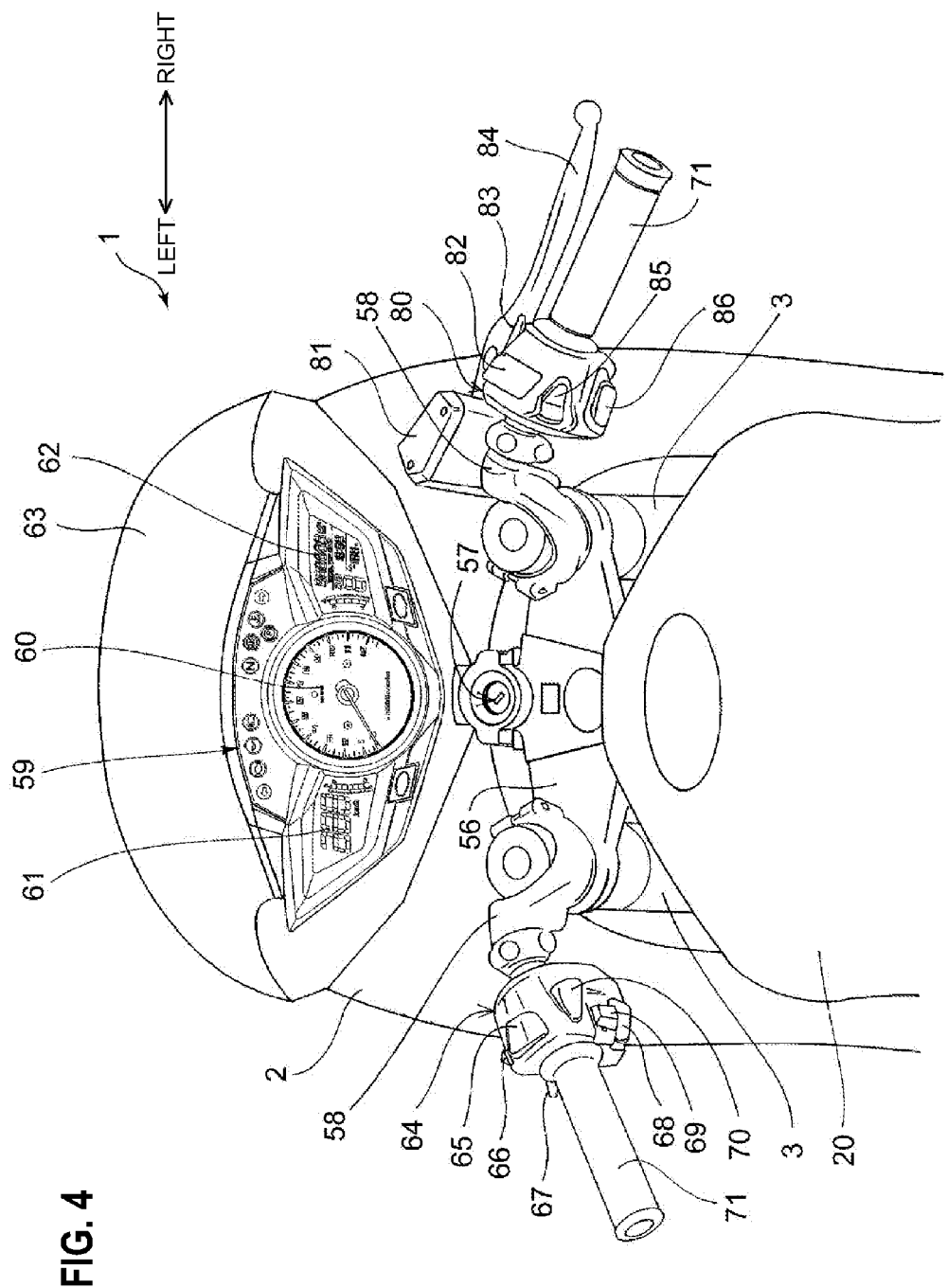
FIG. 4 is a partial enlarged view around a meter of a motorcycle.

FIG. 4 is a partial enlarged view around a meter of the motorcycle 1. The drawing (FIG. 4) is obtained by looking down the vicinity of the handlebar from a rear upper part of the vehicle body, and shows a state generally same to a state a rider seated on the seat 15 sees. The vehicle body front side of a steering handlebar 58 steering the front wheel WF is covered with the cowling 2 as an external component. A windshield screen 63 is attached to an upper end of the cowling 2, and below the windshield screen 63, a meter device 59 having a tachometer 60, a left liquid crystal panel 61 displaying a vehicle speed and the like and a right liquid crystal panel 59 including a distance meter and the like is disposed.

The front wheel WF of the motorcycle 1 is rotatably journaled to a lower end of a pair of right and left front forks 3, and upper parts of the front forks 3 are connected and fixed to each other by a top bridge 56 attached with a main switch 57. The top bridge 56 is turnably attached to the vehicle body frame F of the motorcycle 1 through a steering stem not shown, and the steering handlebar 58 is fixed to upper ends of the front forks 3. The fuel tank 20 is disposed between the top bridge 56 and a seat not shown.

Handlebar grips 71 formed of tube-like rubber and the like and gripped by an occupant are respectively attached to bar sections of the right and left steering handlebars 58. A front wheel brake lever 84 is disposed on the vehicle body front side of the right handlebar grip 71, and to a base part of the front wheel brake lever 84, a reserve tank 81 storing hydraulic fluid of a hydraulic brake system is attached. Also, the right handlebar grip 71 is supported so as to be turnable with respect to the handlebar, and is constituted so as to operate a throttle mechanism by turning operation thereof.

A handlebar switch 80 including operation switches of various electrical equipment is attached to the right steering handlebar 58 adjacently to the handlebar grip 71. In the handlebar switch 80, an engine stop switch 82, a neutral/drive (N/D) changeover switch 85, a starter switch 86, and a travel mode changeover switch 83 are arranged.

The travel mode changeover switch 83 of a swing press type (returning to the initial position when the pressing force is released) attached on the vehicle body front side is operated by being drawn to a near side (occupant side) by an index finger of a right hand, and switching of the drive mode (AT) and the manual shift mode (MT) is executed at every operation. Also, the engine stop switch 82 is of a seesaw switch type in which the position of one side or the other side is maintained unless an operational force is not applied, and stops drive of an ignition device by being operated to an OFF side while the engine is in operation so as to bring the engine to emergency stop.

The N/D changeover switch 85 of the seesaw press type (returning to a neutral position when a pressing force is released) executes a switching operation between neutral (N) and the 1st speed (D) of the automatic transmission with a D side in the left or an N side in the right being pressed while the motorcycle 1 stops. The present embodiment is constituted so as to switch to a sports travel mode (S mode) that attaches greater importance on a drive force compared with an ordinary drive mode when being pressed further to the D side while the drive mode is selected.

The starter switch 86 of a press type disposed in the lowermost position of the handlebar switch 80 is operated in order to start the engine when the ignition switch is in the ON state and the transmission is in the neutral state.

On the other hand, to the left steering handlebar 58, a handlebar switch 64 including operation switches of various electrical equipment is attached adjacently to the vehicle body center side of the handlebar grip 71. In the left handlebar switch 64, a light axis changeover switch 65 of a headlight (head lamp), a horn switch 70, a turn indicator switch 69, a hazard lamp switch 66, a shift up switch 67 and a shift down switch 68 executing the shift operation of the automatic transmission are arranged.

Figure 5:
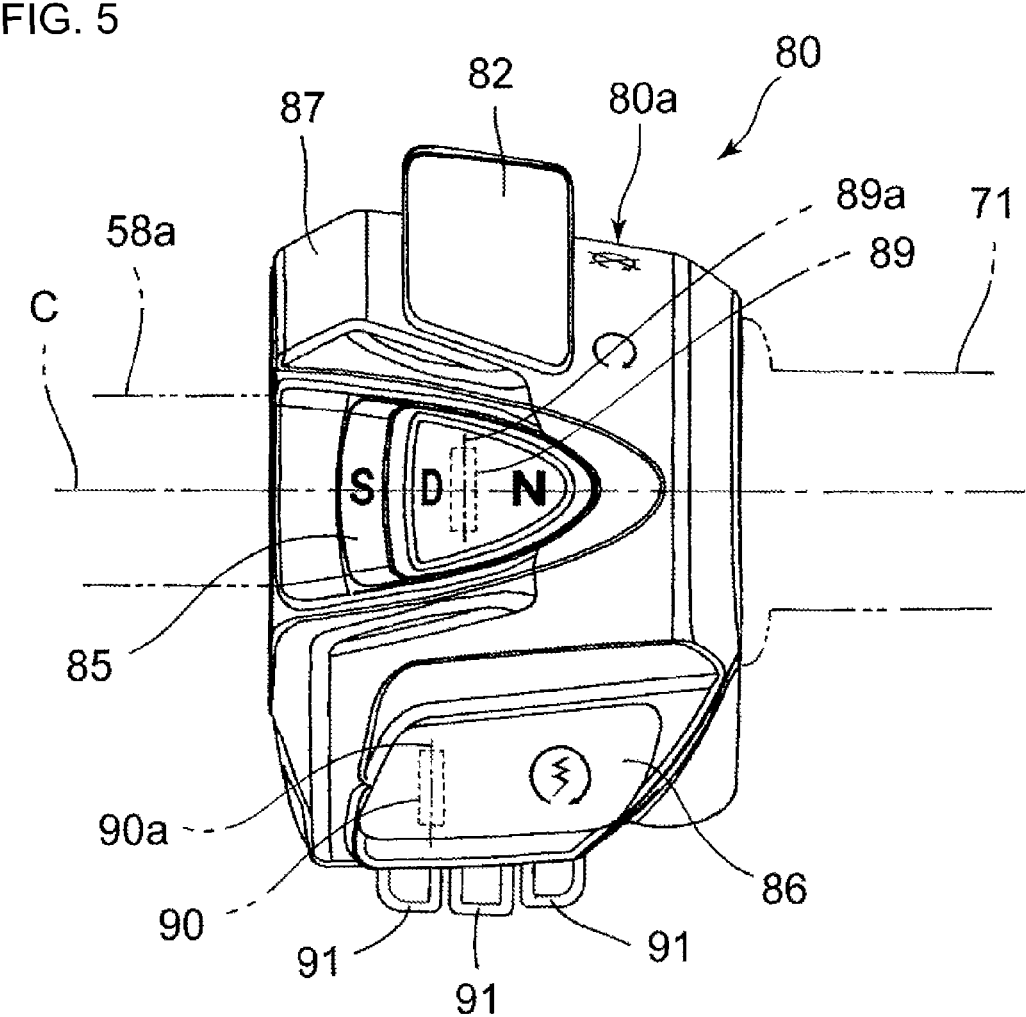
FIG. 5 is a front view of a right handlebar switch.
Figure 6:
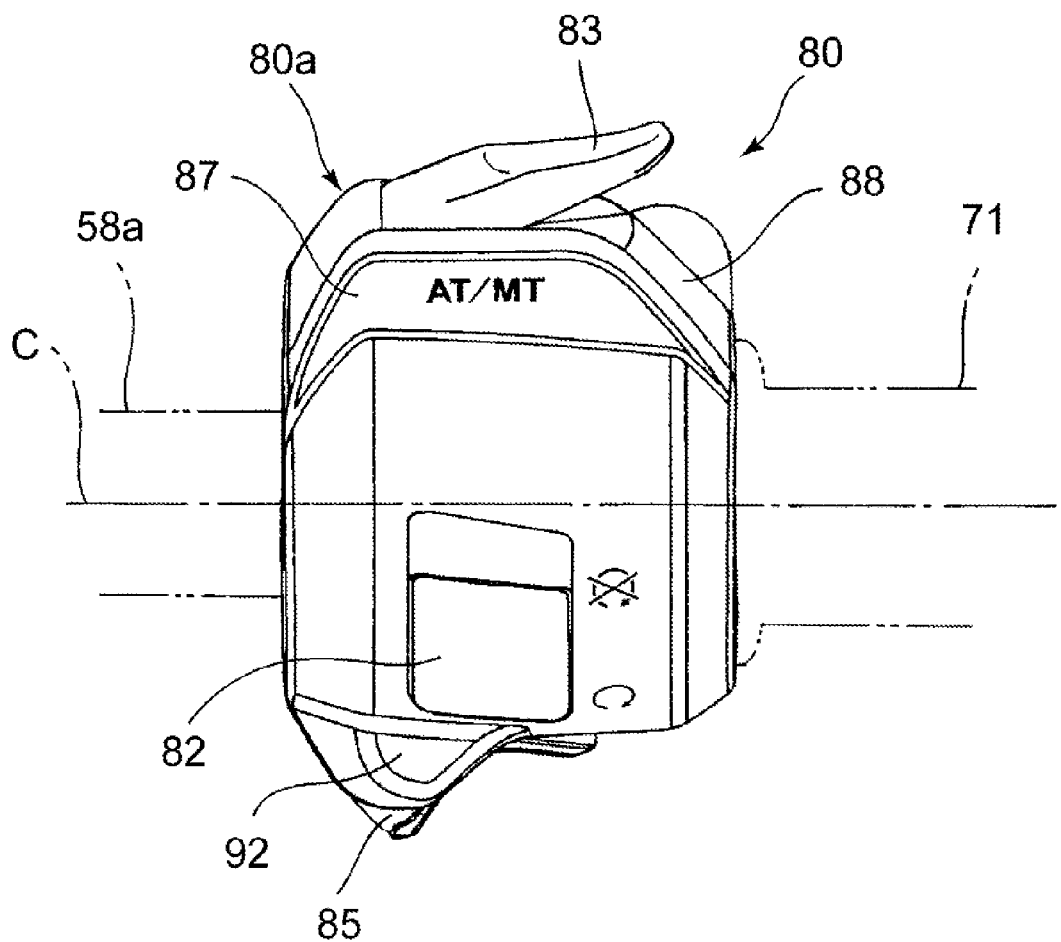
FIG. 6 is a top view of the right handlebar switch.

FIG. 5 is a front view of a right handlebar switch 80. Also, FIG. 6 is a top view of the same. The handlebar switch 80 is configured that plural switches operating various electrical equipment are attached to a box-like switch case 80a formed of a resin and the like. The switch case 80a is composed of a rear side case half body 87 on the occupant side and a front side case half body 88 on the vehicle body front side.

The travel mode changeover switch 83 attached on the vehicle body front side of the switch case 80a executes switching between the drive mode (AT) and the manual shift mode (MT) at every operation. Also, the N/D changeover switch 85 disposed at a generally same height in the vehicle body vertical direction with respect to an axial line C of a handlebar 58a is of the seesaw press type swinging around a swing shaft 89, and can switch between the neutral (N) state and the 1st speed (D) of the automatic transmission by pressing the D side or the N side by a thumb while the motorcycle 1 stops. Above and below the N/D changeover switch 85, partition plates 92 guiding the direction of the thumb and allowing correct operation are arranged. Also, a swing shaft 90 of the N/D changeover switch 85 is disposed so that a center line 90a thereof is oriented in the vehicle body vertical direction.

The starter switch 86 of a press type disposed in a lowermost position of the handlebar switch 80 is of a swing press type swinging around the swing shaft 90. The swing shaft 90 is disposed so that the center line 90a thereof is oriented in the vehicle body vertical direction. In a lower surface part of the switch case 80a, three water drainage holes 91 for discharging moisture that has encroached to the inside of the switch case 80a toward the vehicle body rear side are formed.

Figure 7:
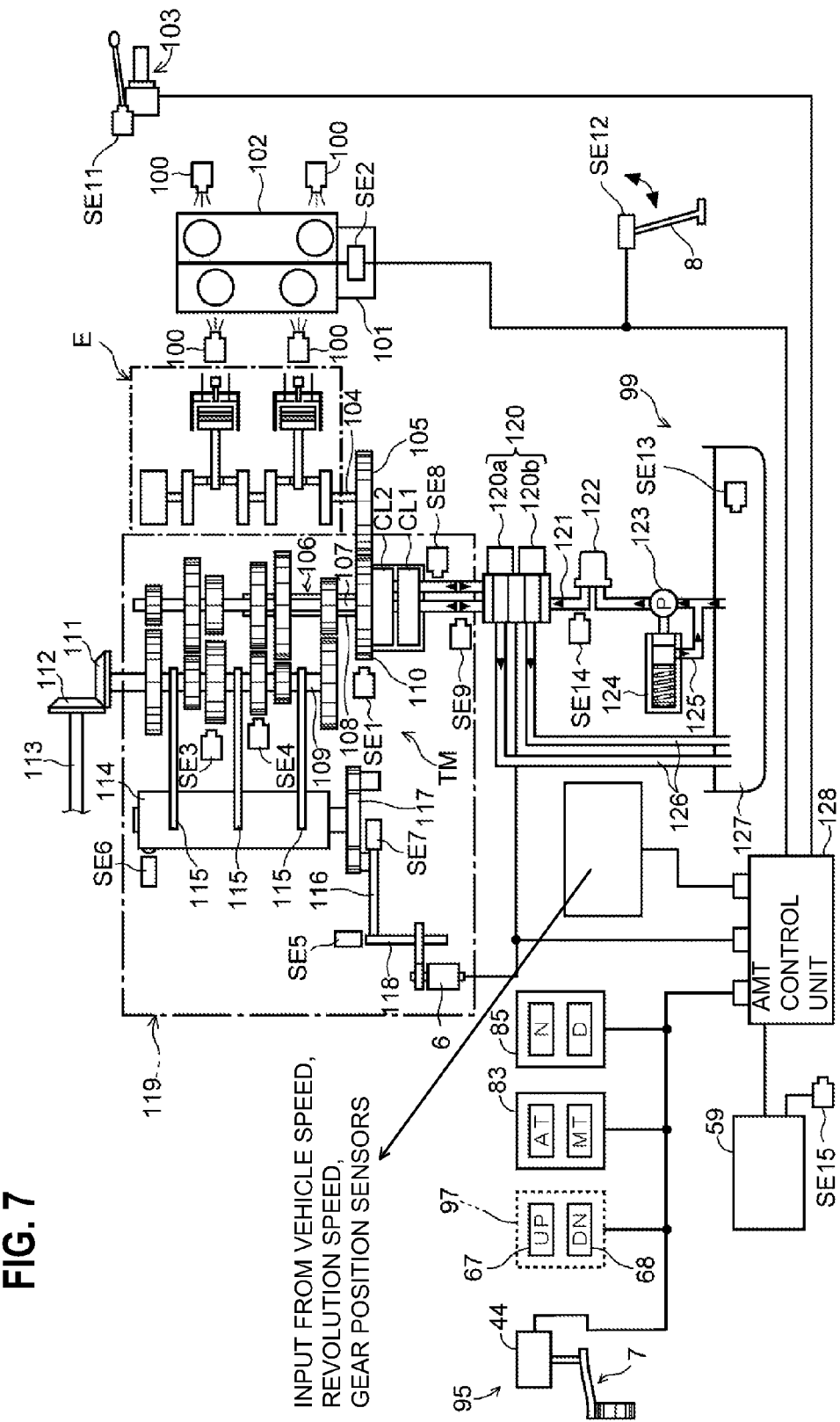
FIG. 7 is a system block diagram of an automatic manual transmission and peripheral devices thereof.
Figure 8:
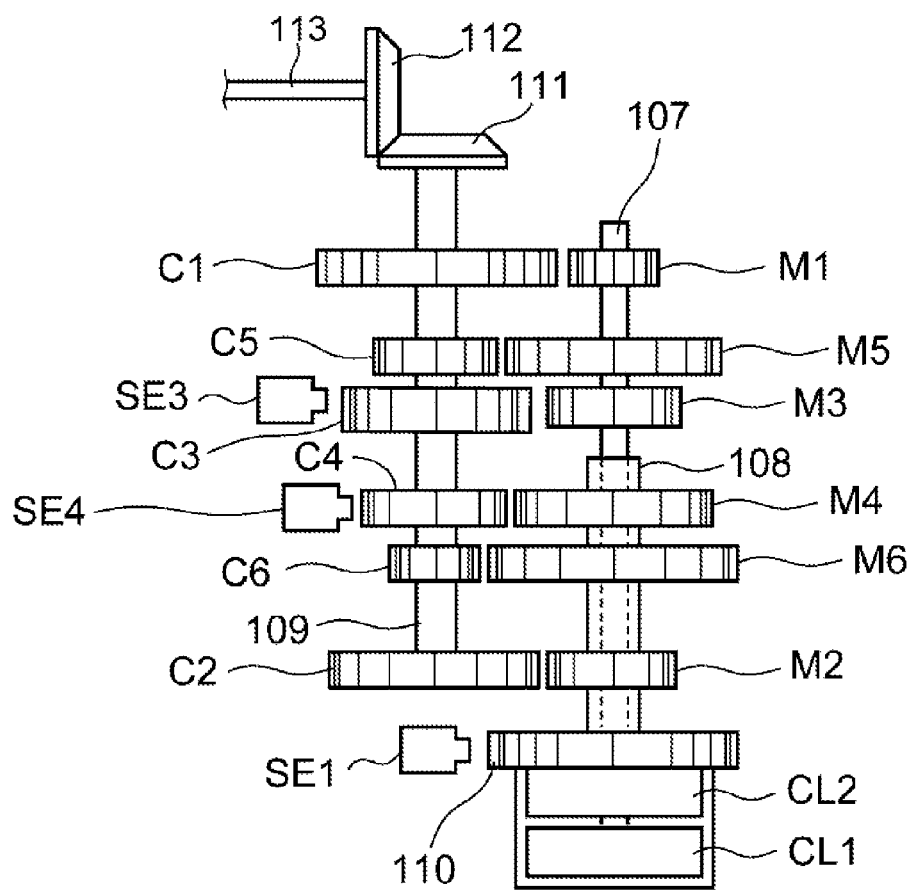
FIG. 8 is a layout relation drawing showing the meshing relation of respective shafts and shift gears in the AMT.

FIG. 7 is a system block diagram of an automatic manual transmission (hereinafter referred to as an AMT) 119 as an automatic transmission applied to the motorcycle 1 and peripheral devices thereof. Also, FIG. 8 is a layout relation drawing showing the meshing relation of respective shafts and shift gears in the AMT 119. The AMT 119 is a twin clutch type shift device connecting and disconnecting rotary power of the engine E by two clutches disposed on a main shaft. Drive of the AMT 119 connected to the engine E is controlled by a hydraulic device for clutch 99 and an AMT control unit 128 as a shift control device. The engine E includes a throttle body 102 of a throttle-by-wire type, and the throttle body 102 includes a motor 101 for opening and closing a throttle valve. In the vicinity of the throttle body 102, injectors 100 of a fuel injection device are arranged for respective cylinders.

The AMT 119 includes the transmission TM of forward six stages, a first clutch CL1, a second clutch CL2, the shift drum 114, and the shift control motor 6 turning the shift drum 114. Many gears constituting the transmission TM are joined or loosely fitted to a main shaft 106 and a countershaft 109 respectively. The main shaft 106 includes an inner main shaft 107 and an outer main shaft 108, the inner main shaft 107 is joined to the first clutch CL1, and the outer main shaft 108 is joined to the second clutch CL2. In the main shaft 106 and the countershaft 109, shift gears displaceable in the axial direction of the main shaft 106 and the countershaft 109 are arranged respectively, and ends of shift forks 115 respectively engage with guide grooves (not shown) formed in the shift gears and the shift drum 114.

To an output shaft of the engine E that is a crankshaft 104, a primary driving gear 105 is joined, and the primary driving gear 105 meshes with a primary driven gear 110. The primary driven gear 110 is connected to the inner main shaft 107 through the first clutch CL1, and is connected to the outer main shaft 108 through the second clutch CL2. Also, the AMT 119 includes an inner main shaft rotational speed sensor SE3 and an outer main shaft rotational speed sensor SE4 detecting rotational speed of the inner main shaft 107 and the outer main shaft 108 respectively by measuring rotational speed of predetermined shift gears on the countershaft 109.

A ring gear 111 is joined to an end of the countershaft 109. A pinion gear 112 fixed to an end of the drive shaft 13 meshes with the ring gear 111. The drive shaft 13 transmits rotary power to the rear wheel WR as a driving wheel.

In the AMT 119, an engine speed sensor SE1 arranged so as to oppose an outer periphery of the primary driven gear 110, a gear position sensor SE7 detecting a present gear stage level based on a rotational position of the shift drum 114, a spindle sensor SE5 detecting the turning position of a spindle 118 of a reduction gear in order to detect a turning amount of the shift control motor 6, and a neutral switch SE6 detecting that the shift drum 114 is in the neutral position are arranged. Rotary power of the shift control motor 6 is transmitted to a shift rod 116 turning a shift drum gear 117 through the spindle 118.

In the throttle body 102, a throttle opening sensor SE2 detecting opening of the throttle valve is arranged. Also, to the AMT control unit 128, information from the throttle grip opening sensor SE11 detecting a manipulated variable of a throttle mechanism 103 disposed in the steering handlebar and the like and a side stand switch SE12 detecting a storing state of the side stand 8 is inputted. The AMT control unit 128 can display an engine speed, vehicle speed and the like, as well as vehicle information based on various sensor information on the meter device 59. Further, to the meter device 59, information from a parking brake switch SE15 detecting a working state of a parking brake used in parking is also inputted.

The hydraulic device for clutch 99 is constituted to use both of lubricating oil of the engine E and hydraulic fluid driving the clutch CL. The hydraulic device for clutch 99 includes an oil tank 127 and a pipe line 121 for supplying oil (hydraulic fluid) in the oil tank 127 to the first clutch CL1 and the second clutch CL2.

An oil temperature sensor SE13 is arranged inside the oil tank 127. A line oil pressure sensor SE14, an oil filter 122, a hydraulic pump 123 as an oil pressure supply source, and a valve (electronic control valve) 120 as a motor-driven actuator are arranged on the pipe line 121. A regulator 124 for maintaining oil pressure supplied to the valve 120 at a constant value is arranged on a return pipe line 125 connected to the pipe line 121. The valve 120 is constituted so as to be capable of supplying oil pressure to the first clutch CL1 and to the second clutch CL2 individually. Further, in valves 120a, 120b also, return pipe lines 126 of oil are arranged respectively.

A first clutch oil pressure sensor SE8 measuring oil pressure generated in the first clutch CL1 is arranged on a pipe line connecting the first valve 120a and the first clutch CL1. Similarly, a second clutch oil pressure sensor SE9 measuring oil pressure generated in the second clutch CL2 is arranged on a pipe line connecting the second valve 120b and the second clutch CL2.

The travel mode changeover switch 83 executing switching between the drive mode (AT mode) executing automatic shift and the manual shift mode (MT mode), a hand operated shift switch 97 including the shift up switch 67 and the shift down switch 68 instructing shift up (UP) or shift down (DN), the N/D switchover switch 85 executing switching between neutral (N) and drive (D), and foot operated shift control unit 95 including the shift pedal 7 and the potentiometer 44 detecting the turning operation of the shift pedal 7 are each connected to the AMT control unit 128. The AMT control unit 128 includes a central processing unit (CPU), controls the valve 120 and the shift control motor 6 according to an output signal of the various sensors and switches described above, and switches a gear stage level of the AMT 119 automatically or semi-automatically.

The AMT control unit 128 automatically switches the shift stage level according to information such as the vehicle speed, engine speed, throttle opening and the like when the drive mode is selected, and on the other hand, shifts up or shifts down the transmission TM accompanying operation of the hand operated shift switch 97 or the shift pedal 7 when the manual shift mode is selected. Also, even when the manual shift mode is selected, it is possible to execute auxiliary automatic shift control for preventing overspeed and a stall of an engine.

In the hydraulic device for clutch 99, oil pressure is applied to the valve 120 by the hydraulic pump 123, and the oil pressure is controlled by the regulator 23 so as not to exceed an upper limit value. When the valve 120a or 120b is opened by an instruction from the AMT control unit 128, oil pressure is applied to the first clutch CL1 or the second clutch CL2, and the primary driven gear 110 is connected to the inner main shaft 107 or the outer main shaft 108 through the first clutch CL1 or the second clutch CL2.

On the other hand, when the valve 120 is closed and application of the oil pressured is stopped, the first clutch CL1 and the second clutch CL2 are driven to the direction of disconnecting connection with the inner main shaft 107 and the outer main shaft 108 by an energizing force of a return spring (not shown).

With respect to the valve 120 driving the clutch by opening and closing a pipe line connecting the pipe line 121 and both the clutches CL1, CL2, the AMT control unit 128 can optionally change time from a fully closed state of the pipe line to a fully open state and the like based on the drive signal.

The shift control motor 6 turns the shift drum 114 according to an instruction from the AMT control unit 128. When the shift drum 114 turns, the shift forks 115 are displaced in the axial direction of the shift drum 114 according to the shape of the guide grooves formed in the outer periphery of the shift drum 114. Accompanying the displacement, meshing of gears on the countershaft 109 and the main shaft 106 changes, and shift up or shift down of the transmission TM is executed.

The AMT 119 in relation with the present embodiment is constituted so that the inner main shaft 107 joined with the first clutch CL1 supports odd numbered stage gears (1st, 3rd, 5th speed) and the outer main shaft 108 joined with the second clutch CL2 supports even numbered stage gears (2nd, 4th, 6th speed). Accordingly, for example, while traveling with an odd numbered stage gear, oil pressure supply to the first clutch CL1 is continued and the connection state is maintained. Also, when shift change is to be executed, by changing meshing of gears beforehand by turning of the shift drum 114, that is by executing "preparatory shifting", a shift motion can be completed only by switching the connection state of both the clutches.

FIG. 8 is a layout relation drawing showing the meshing relation of the shift gears. The inner main shaft 107 connected to the first clutch CL1 supports driving gears M1, M3, M5 of odd numbered shift stages. The 1st speed driving gear M1 is formed integrally with the inner main shaft 107. Also, the 3rd speed driving gear M3 is attached slidably in the axial direction and non-rotatably in the peripheral direction, and the 5th speed driving gear M5 is attached non-slidably in the axial direction and rotatably in the peripheral direction.

The outer main shaft 108 connected to the second clutch CL2 supports driving gears M2, M4, M6 of even numbered shift stages. The 2nd speed driving gear M2 is formed integrally with the outer main shaft 108. Also, the 4th speed driving gear M4 is attached slidably in the axial direction and non-rotatably in the peripheral direction, and the 6th speed driving gear M6 is attached non-slidably in the axial direction and rotatably in the peripheral direction.

On the other hand, the countershaft 109 supports driven gears C1-C6 that mesh with the driving gears M1-M6. The driven gears C1-C4 of the 1st speed to the 4th speed are attached non-slidably in the axial direction and rotatably in the peripheral direction, and the driven gears C5, C6 of the 5th and 6th speed are attached slidably in the axial direction and non-rotatably in the peripheral direction. The shift forks 115 (refer to FIG. 7) make the driving gears M3, M4 and the driven gears C5, C6 that are the gears slidable in the axial direction out of the gear trains slide, and thereby connect and disconnect dog clutches formed on the respective gears.

When the 1st speed gear is selected, for example, the AMT 119 transmits rotary power of the engine transmitted from the crankshaft 104 to the primary driven gear 110 to the inner main shaft 107 by connection of the first clutch CL1, and transmits the rotary power from the 1st speed driving gear M1 to the countershaft 109 through the 1st speed driven gear C1. At this time, the dog clutch for the 1st speed is in a state of meshing between the 1st speed driven gear C1 and the 5th speed driven gear C5.

Also, the AMT 119 executes "preparatory shifting" engaging the dog clutch for the 2nd speed that is the dog clutch between the 6th speed driven gear C6 and the 2nd speed driven gear C2 while the rotary power is transmitted by the 1st speed gears and preparing for shifting to the 2nd speed. At this time, because the second clutch CL2 has been disengaged, even when the dog clutch for the 2nd speed is engaged while traveling with the 1st speed gears, the rotary power of the engine only makes the outer main shaft 108 idle through the 2nd speed driving gear M2. Further, when the connection side clutch is switched from the first clutch CL1 to the second clutch CL2 after completion of the preparatory shifting, the rotary power comes to be outputted through the 2nd speed gears instantaneously without interrupting the rotary power.

Figure 9:
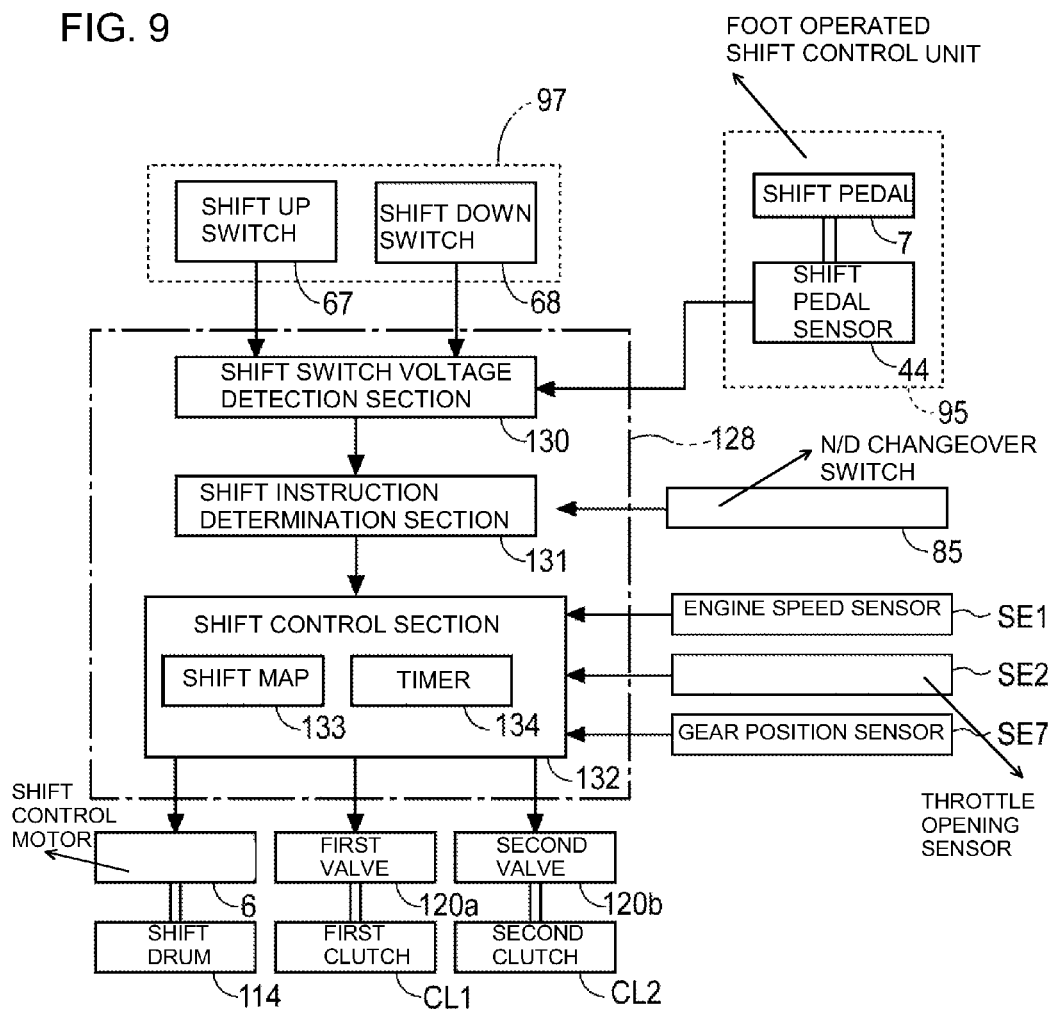
FIG. 9 is a block diagram showing a constitution of an AMT control unit and peripheral apparatuses thereof.

FIG. 9 is a block diagram showing a constitution of the AMT control unit 128 and peripheral apparatuses thereof. A reference sign same to the above expresses a same or similar part. The AMT control unit 128 includes a shift switch voltage detection section 130, a shift instruction determination section 131, and a shift control section 132. The shift control section 132 includes a shift map 133 and a timer 134 measuring various times.

The shift switch voltage detection section 130 detects an output signal of the shift up switch 67 and the shift down switch 68 and an output signal of the shift pedal sensor 44. In the present embodiment, the shift up switch 67 and the shift down switch 68 are constituted of a switch outputting an on-signal or an off-signal, whereas the shift pedal sensor 44 is constituted of a potentiometer outputting voltage corresponding to the turning angle of the shift pedal 7.

The shift instruction determination section 131 determines whether a shift requirement of shift up or shift down has been satisfied or not based on information from the shift switch voltage detection section 130, and transmits the determination to the shift control section 132. The shift requirement includes a hand operated shift requirement based on an output signal of the shift up switch 67 and the shift up switch 68 that is a hand operated shift switch and a foot operated shift requirement based on an output signal of the shift pedal sensor 44 that is a foot operated shift switch. The shift instruction determination section 131 is inputted with an output signal from the N/D changeover switch 85, and the shift control section 132 executes automatic shift based on the predetermined shift map 133 when the drive mode has been selected.

Further, when the shift up switch 67 and the shift down switch 68 are constituted of a potentiometer, it is also possible to calculate operation speed of both the switches by the timer 134 and to execute shift control corresponding to the operation speed.

As described above, when the drive mode is selected, the shift control section 132 drives the shift control motor 6 and the valve 120 (the first valve 120a and the second valve 120b) according to the shift map 133 including a three-dimensional map and the like based on output information of the engine speed sensor SE1, the throttle opening sensor SE2, the gear position sensor SE7 and the like, and executes a shift motion automatically. In the drive mode, clutch switching speed in shifting from the present shift position to a neighboring shift position is prescribed by the shift map 133 and the like. On the other hand, when the manual shift mode is selected, manual shift according to a shift requirement of the hand operated shift switch and the foot operated shift switch can be executed within the range in which overspeed of the engine E, an engine stall and the like do not occur.

Figure 10:
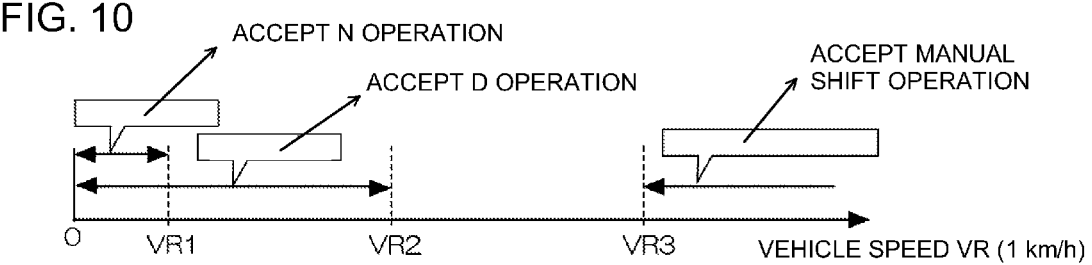
FIG. 10 is a drawing showing the relation between the vehicle speed of a motorcycle and acceptable shift operation.

FIG. 10 is a drawing showing the relation between the vehicle speed of the motorcycle 1 and acceptable shift operation. First, in the present embodiment, it is set to accept manual shift operation by a hand operated shift switch (the shift up switch 67 and the shift down switch 68) or a foot operated shift switch (the shift pedal sensor 44) in a state the vehicle speed VR exceeds VR3 (18 km/h, for example). Next, it is set to accept switching from the neutral state to the drive mode by operation of the N/D changeover switch when the vehicle speed VR is less than a vehicle speed VR2 (10 km/h, for example) as a second vehicle speed less than the vehicle speed VR3. Further, it is set to accept switching from the drive mode to the neutral state by operation of the N/D changeover switch when the vehicle speed VR is less than a vehicle speed VR1 (3 km/h for example) as a first vehicle speed less than the vehicle speed VR2.

According to the setting described above, switching from the drive mode to the neutral state in a high vehicle speed state is prevented, and execution of shift control suitable to the traveling state is allowed. Also, by setting the first vehicle speed VR1 to a quite small value, execution of switching to the neutral state in a state the motorcycle is highly possible to stop is allowed. Further, by setting the second vehicle speed VR2 higher than the first vehicle VR1, even when the vehicle speed has increased a little in the neutral state in starting on a downward slope and the like for example, smooth switching to the drive mode is allowed.

Further, the present embodiment is featured in that switching from the neutral state to the drive mode can be executed not only by the N/D changeover switch 85 arranged in the handlebar switch 80 but also by the shift pedal 7. On the other hand, it is set so that switching from the neutral state to the drive mode is not executed even when the shift up switch 67 or the shift down switch 68 arranged in the handlebar switch 64 is operated in the neutral state regardless of the level of the vehicle speed VR.

Figure 11:
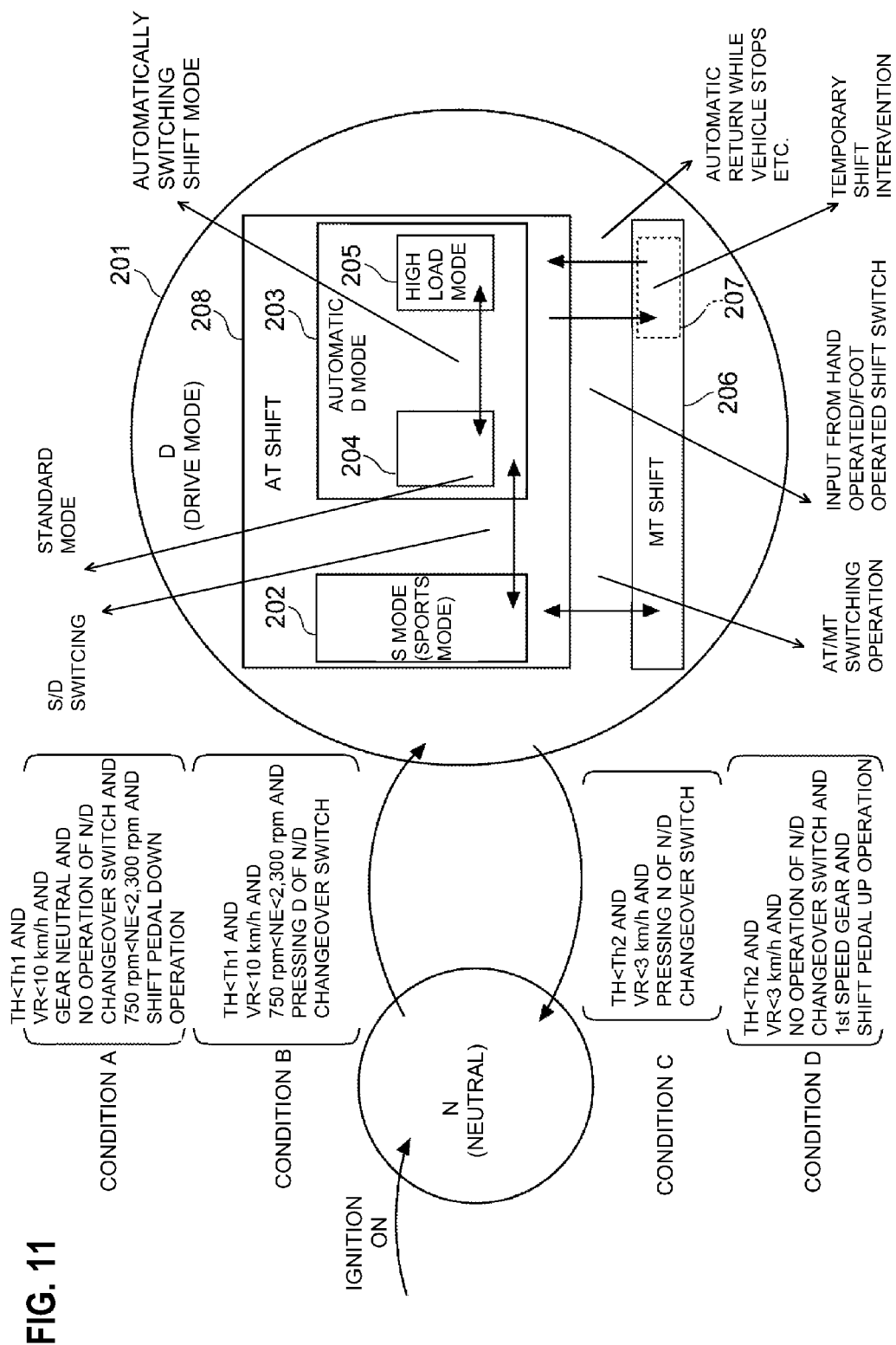
FIG. 11 is a state transition chart showing the relation between a neutral state and a drive mode.

FIG. 11 is a state transition chart showing the relation between the neutral state and the drive mode. First, when the ignition switch is turned on, the transmission TM is in a neutral state 200. Also, the present embodiment is constituted so that, even if a drive mode 201 has been selected when the ignition switch is turned off, the drive mode 201 is switched to the neutral state 200 by turning off the ignition switch.

Switching from the neutral state 200 to the drive mode 201 is executed by satisfying a condition A or a condition B. The condition A is in a case involving operation of the shift pedal 7, and is that the shift pedal 7 is operated DOWN (shift down) in a state a throttle opening TH is less than Th1 (0.49 degrees, for example), the vehicle speed VR is less than 10 km/h, the gear is neutral, the N/D changeover switch 85 is not operated, and an engine speed NE exceeds NE1 (750 rpm, for example) and less than NE2 (2,300 rpm, for example). Also, in the present embodiment, stepping down the shift pedal 7 by the toe becomes shift down operation.

On the other hand, the condition B is in a case involving operation of the N/D changeover switch 85, and is that the D side of the N/D changeover switch 85 is pressed in a state the throttle opening TH is less than Th1, the vehicle speed VR is less than 10 km/h, and the engine speed NE exceeds NE1 and less than NE2.

Further, switching from the drive mode 201 to the neutral state 200 is executed by satisfying a condition C or a condition D. The condition C is in a case involving operation of the N/D changeover switch 85, and is that the N side of the N/D changeover switch 85 is pressed in a state the throttle opening TH is less than Th2 (Th1<Th2. 0.78 degrees, for example) and the vehicle speed VR is less than 3 km/h.

On the other hand, the condition D is in a case involving operation of the shift pedal 7, and is that the throttle opening TH is less than Th2, the vehicle speed VR is less than 3 km/h, the N/D changeover switch 85 is not operated, and the shift pedal 7 is operated UP (shift up). Also, in the present embodiment, pushing up the shift pedal 7 by the toe becomes the shift up operation.

Further, the present embodiment is constituted so that the clutch oil pressure is generated when the throttle opening TH is 0.8 degrees or more. Accordingly, in the condition C and the condition D, an event that the clutch oil pressure has not been generated is included in the conditions.

On the other hand, when the transmission TM transitions into the drive mode 201, the mode becomes an automatic D mode 203 including a standard mode 204 having a different shift map corresponding to the travel condition or a high load mode 205. In the automatic D mode 203, switching between the standard mode 204 and the high load mode 205 is also executed automatically. Further, it is set to shift to an S mode (sports mode) 202 having the shift map positively using a high rotation region of the engine E when the D side of the N/D changeover switch 85 is pressed further while the mode is the automatic D mode.

Also, when the travel mode changeover switch 83 is operated in a state of an AT shift 208 including the automatic D mode 203 and the S mode 202, the shift transitions into a state of an MT shift 206 allowing a temporary shift intervention 207. Further, when the hand operated shift switch (the shift up switch 67 and the shift down switch 68) or the foot operated shift switch (the shift pedal sensor 44) is operated in a state of the AT shift 208, the transmission TM shifts to a state of the MT shift 206 upon the first shift motion.

Shifting from the MT shift 206 to the AT shift 208 is executed not only by operation of the travel mode changeover switch 83 but also by automatic return while the vehicle stops and the like.

According to the setting described above, even when the hand operated shift switch 97 is operated from the neutral state, the transmission TM is not switched to the drive mode; whereas when the shift pedal 7 is used, the neutral state is switched to the drive mode by operation of the shift pedal 7 to consecutively allow the manual shift by the shift pedal 7. Therefore immediate shifting from the neutral state to the drive mode and the foot operated manual shift is allowed without operation of the N/D changeover switch 85 arranged around the handlebar.

Thus, in a shift control device for a motorcycle in which the N/D changeover switch 85 and the hand operated shift switch 97 are arranged in the handlebar, even when a foot operated shift switch by the shift pedal 7 is further arranged, shift operation similar to that of an ordinary motorcycle of switching from the neutral state to a travel allowing state is allowed by operation of the shift pedal 7, and it is allowed to improve usability without imparting a sense of incongruity to a rider.

Figure 12:
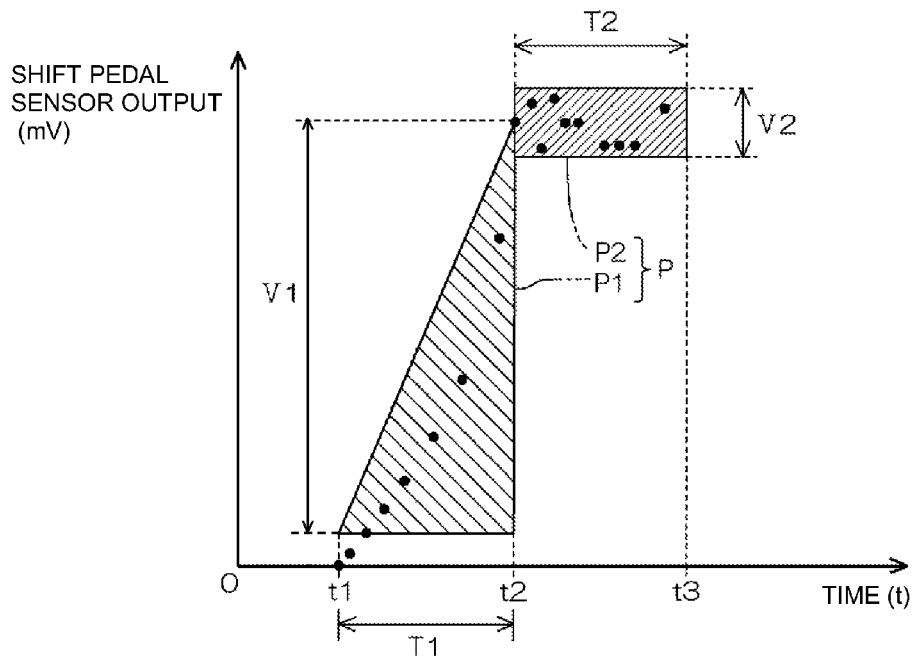
FIG. 12 is a graph showing the condition for fixing a shift requirement by foot operated shift control unit.

FIG. 12 is a graph showing the condition for fixing a shift requirement by the foot operated shift control unit 95. In the present embodiment, a potentiometer is used for the shift pedal sensor 44, and a foot operated shift requirement of shift up or shift down is fixed only when a sensor output of the shift pedal sensor 44 falls within a range of a predetermined input signal pattern P (P1, P2). Thus, an effect of noise and the like on the fixing process of the foot operated shift requirement can be reduced.

More specifically, the input signal pattern P includes a generally triangle section P1 corresponding to a period when the shift pedal 7 is in a turning motion toward one direction or the other direction and a generally rectangular section P2 corresponding to a period until a predetermined time T1 passes in a state the shift pedal 7 cannot turn any more by the stopper mechanism 54 (refer to FIG. 3). The sensor output is shown by plural black dots.

The triangle section P1 can be formed so that, for example, a variation of a sensor output becomes a predetermined value V1 (105 mV for example) or less during a predetermined time T1 (100 ms for example) from time t1 when the shift pedal 7 starts turning to time t2.

Further, the rectangular section P2 can be formed so that a variation of the sensor output becomes a predetermined value V2 (40 mV for example) or less during a predetermined time T2 (70 ms for example) from the time t2 to time t3. By using such the pattern P, setting so that a foot operated shift requirement is not fixed when a rider erroneously touches the shift pedal 7 and the like is allowed, and the foot operated shift requirement can be detected easily and properly.

Figure 13:
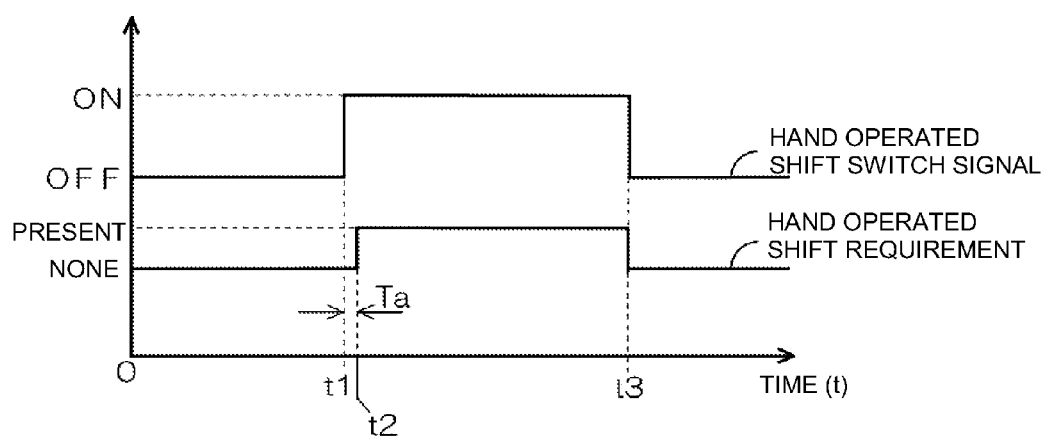
FIG. 13 is a graph showing the relation between an output signal of a hand operated shift switch and a hand operated shift requirement.

FIG. 13 is a graph showing the relation between an output signal of the hand operated shift switch 97 and a hand operated shift requirement. In the present embodiment, it is set so that, when the hand operated shift switch 97 is switched to ON at the time t1, the hand operated shift requirement is fixed at the time t2 after a predetermined time Ta (15 ms for example). Thus, a shift motion not intended by an occupant can be prevented, and the shift requirement can be fixed after confirming the intention of the occupant of shifting.

On the other hand, when the hand operated shift switch 97 that has been pressed is to be released, the hand operated shift requirement returns to "none" quickly when the sensor output becomes zero.

Figure 14:
FIG. 14 is a graph showing the relation between an output signal of a shift pedal sensor as a foot operated shift switch and a foot operated shift requirement.

FIG. 14 is a graph showing the relation between an output signal of the shift pedal sensor 44 as a foot operated shift switch and a foot operated shift requirement. When the foot operated shift switch 97 is operated, after starting operation of the shift pedal 7 at time t5, collation with the input signal pattern P shown in FIG. 2 is executed, the foot operated shift requirement is fixed at time t6, and the foot operated shift requirement becomes "present". When the shift pedal 7 is to be returned to the neutral position, the foot operated shift requirement returns to "none" at time t7 when the sensor output becomes less than a predetermined value.

FIG. 15 is a time chart showing the relation between a foot operated shift requirement and a hand operated shift requirement. In the present embodiment, it is set so that the hand operated shift requirement and the foot operated shift requirement are fixed at same timing, and, when both the shift requirements are common in shift up or shift down, shift control is executed according to the shift requirement. Accordingly, it is constituted so that, for example, when the hand operated shift requirement of shift up and the foot operated shift requirement of shift up are fixed at the same timing, it is determined that the intention of the rider of shifting has been fixed, and shift up is executed.

On the other hand, all patterns A, B, C, D shown in the time chart show a case the foot operated shift requirement of shift up and the contrary hand operated shift requirement of shift down are fixed at timing close to each other. In the present embodiment, it is constituted so that shift control is executed based on a shift requirement fixed earlier, and after a shift motion is executed, next shift requirement is not accepted until a predetermined time Tb (500 ms for example) passes.

In the pattern A, at time t10, accompanying that the hand operated shift requirement of shift down has been fixed, shift down is executed. Here, although the foot operated shift requirement of shift up has been fixed soon after the hand operated shift requirement of shift down has been fixed, because next shift requirement is not accepted until the predetermined time Tb passes after the hand operated shift requirement of shift down is fixed, the foot operated shift requirement fixed later is ignored.

Next, in the pattern B, at time t11, accompanying that the foot operated shift requirement of shift up has been fixed, shift up is executed. Although the hand operated shift requirement of shift down has been fixed soon after the hand operated shift requirement of shift up has been fixed, because next shift requirement is not accepted until the predetermined time Tb passes after the foot operated shift requirement of shift up is fixed, the hand operated shift requirement fixed later is ignored.

Also, in the pattern C, at time t12, accompanying that the hand operated shift requirement of shift down has been fixed, shift down is executed. Although the foot operated shift requirement of shift up has been fixed soon after the hand operated shift requirement of shift down has been fixed, because next shift requirement is not accepted until the predetermined time Tb passes after the hand operated shift requirement of shift down is fixed, the foot operated shift requirement is ignored.

Also, in the pattern D, at time t13, the hand operated shift requirement of shift down and the foot operated shift requirement of shift up are fixed at the same time. In the present embodiment, it is set so that, when the hand operated shift requirement and the foot operated shift requirement are fixed at the same timing and both the shift requirements are different from each other in shift up and shift down, both of the fixed shift requirements are cancelled. Accordingly, at the time t13, shifting is not executed, and the state becomes a state of waiting for a next shift requirement.

According to the setting described above, for example, when the vehicle body rocks due to unevenness of the road surface in executing shift up by hand operated shift and an occupant unintentionally touches a foot pedal and executes shift down operation simultaneously and the like, execution of shift change not intended by the occupant can be prevented.

Also, the shape and structure of the handlebar switch, hand operated shift switch (shift up switch and shift down switch), shift pedal and shift pedal sensor, various setting values of the predetermined vehicle speed VR1, VR2, VR3 and the like, mutual switching condition between the neutral state and the drive mode and the like are not limited to the embodiment described above, and various alterations are possible. The shift control device in relation with the present invention can be applied not only to a motorcycle but also to various vehicles such as saddle-ride type three/four-wheeled vehicles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A shift control device for a motorcycle, said shift control device comprising:
   a transmission that allows switching among a neutral state and a plurality of shift positions;
   a shift control section that controls a shift state of the transmission;
   an N/D changeover switch that switches between the neutral state and a drive mode for executing automatic shift among the plurality of shift positions;
   a hand operated shift switch that allows manual shifting among the plurality of shift positions by operation during the drive mode, the N/D changeover switch and the hand operated shift switch being arranged around a handlebar of the motorcycle; and
   a foot operated shift control unit comprising a foot pedal, said foot operated shift control unit being operable to allow manual shift between the plurality of shift positions and the neutral state during the drive mode according to operation of the foot pedal;
   wherein
   the hand operated shift switch and the foot operated shift control unit are concurrently operable to input shift requirements to the shift control section,
   the shift control section is configured to prioritize between a foot operated shift requirement and a hand operated shift requirement fixed at a timing close to each other,
   the shift control section is further set so as to switch between the neutral state and the drive mode by the foot operated shift control unit,
   the foot pedal is constituted so as to allow a switching motion from a neutral position to an up side and a down side, and
   the shift control section permits switching from the drive mode to the neutral state by the foot operated shift control unit when the foot pedal is operated up and vehicle speed is equal to or below a first predetermined vehicle speed.

2. The shift control device for a motorcycle according to claim 1, wherein the shift control section permits switching from the neutral state to the drive mode when vehicle speed is equal to or below a second predetermined vehicle speed, which is higher than the first vehicle speed.

3. The shift control device for a motorcycle according to claim 2, wherein the shift control section determines whether or not a hand operated shift requirement of shift up or shift down has been fixed based on operation of the hand operated shift switch, determines whether or not a foot operated shift requirement of shift up or shift down has been fixed based on operation of the foot operated shift control unit, and conducts shift control based on a shift requirement fixed earlier from one of the hand operated shift requirement and the foot operated shift requirement.

4. The shift control device for a motorcycle according to claim 3, wherein the shift control section delays acceptance of a next shift requirement for a predetermined time period after the hand operated shift requirement or the foot operated shift requirement is fixed.

5. The shift control device for a motorcycle according to claim 2, wherein when a hand operated shift requirement of shift up or shift down has been fixed based on operation of the hand operated shift switch and a foot operated shift requirement of shift up or shift down has been fixed based on operation of the foot operated shift control unit are fixed at the same timing and both of the shift requirements are common in shift up or shift down, the shift control section conducts shift control according to the fixed shift requirements.

6. The shift control device for a motorcycle according to claim 3, wherein when the hand operated shift requirement and the foot operated shift requirement are fixed at the same timing and both of the shift requirements are common in shift up or shift down, the shift control section conducts shift control according to the fixed shift requirements.

7. The shift control device for a motorcycle according to claim 2, wherein when a hand operated shift requirement of shift up or shift down has been fixed based on operation of the hand operated shift switch and a foot operated shift requirement of shift up or shift down has been fixed based on operation of the foot operated shift control unit are fixed at the same timing and both of the shift requirements are different from each other in shift up and shift down, the shift control section is set to cancel both of the shift requirements being fixed.

8. The shift control device for a motorcycle according to claim 3, wherein when the hand operated shift requirement and the foot operated shift requirement are fixed at the same timing and both of the shift requirements are different from each other in shift up and shift down, the shift control section is set to cancel both of the shift requirements being fixed.

9. The shift control device for a motorcycle according to claim 2, wherein the shift control section fixes a hand operated shift requirement when the hand operated shift switch is pressingly operated continuously for a predetermined time.

10. The shift control device for a motorcycle according to claim 3, wherein the shift control section fixes the hand operated shift requirement when the hand operated shift switch is pressingly operated continuously for a predetermined time period.

11. The shift control device for a motorcycle according to claim 4, wherein the shift control section fixes the hand operated shift requirement when the hand operated shift switch is pressingly operated continuously for a predetermined time period.

12. The shift control device for a motorcycle according to claim 6, wherein the shift control section fixes the hand operated shift requirement when the hand operated shift switch is pressingly operated continuously for a predetermined time period.

13. The shift control device for a motorcycle according to claim 2, wherein:
the foot operated shift control unit includes a shift pedal sensor that detects a turning angle of the foot pedal; and
the shift control section fixes a foot operated shift requirement when an output signal of the shift pedal sensor falls within a range of a preset input signal pattern.

14. The shift control device for a motorcycle according to claim 3, wherein:
the foot operated shift control unit includes a shift pedal sensor that detects a turning angle of the foot pedal; and
the shift control section fixes the foot operated shift requirement when an output signal of the shift pedal sensor falls within a range of a preset input signal pattern.

15. The shift control device for a motorcycle according to claim 4, wherein:
the foot operated shift control unit includes a shift pedal sensor that detects a turning angle of the foot pedal; and
the shift control section fixes the foot operated shift requirement when an output signal of the shift pedal sensor falls within a range of a preset input signal pattern.

16. The shift control device for a motorcycle according to claim 13, wherein
the preset input signal pattern includes a substantially triangular section corresponding to a time period when the foot pedal is in a switching motion, and a substantially rectangular section corresponding to a time period until a predetermined time passes after the foot pedal bumps on a turning position limiter.

17. The shift control device for a motorcycle according to claim 1, wherein:
the hand operated shift switch includes a shift-up switch and a shift-down switch of an on-off type arranged in a handlebar switch of the motorcycle; and
the foot operated shift control unit includes a shift pedal sensor having a potentiometer that detects a turning angle of the foot pedal.

18. A motorcycle comprising
a transmission that allows switching among a neutral state and a plurality of shift positions;
a shift control section that controls a shift state of the transmission;
an N/D changeover switch that switches between the neutral state and a drive mode for executing automatic shift among the plurality of shift positions;
a hand operated shift switch that allows manual shifting among the plurality of shift positions by operation during the drive mode, each of said N/D changeover switch and said hand operated shift switch being arranged around a handlebar of the motorcycle; and
a foot operated shift control unit operable to allow manual shift between the plurality of shift positions and the neutral state during the drive mode;
wherein
the hand operated shift switch and the foot operated shift control unit are concurrently operable to input shift requirements to the shift control section,
the shift control section is configured to prioritize between a foot operated shift requirement and a hand operated shift requirement fixed at a timing close to each other,
the shift control section is configured to permit switching between the neutral state and the drive mode by the foot operated shift control unit based on vehicle speed,
the foot pedal is constituted so as to allow a switching motion from a neutral position to an up side and a down side, and
the shift control section permits switching from the drive mode to the neutral state by the foot operated shift control unit when the foot pedal is operated up and vehicle speed is equal to or below a predetermined vehicle speed.

19. A motorcycle comprising
a transmission that allows switching among a neutral state and a plurality of shift positions;
a shift control section that controls a shift state of the transmission;
an N/D changeover switch that switches between the neutral state and a drive mode for executing automatic shift among the plurality of shift positions;
a hand operated shift switch that allows manual shifting among the plurality of shift positions by operation during the drive mode; and
a foot operated shift control unit operable to allow manual shift between the plurality of shift positions and the neutral state during the drive mode;

wherein each of the hand operated shift switch and foot operated shift control unit are concurrently operable to input shift requirements to the shift control section, the shift control section is configured to prioritize between a foot operated shift requirement and a hand operated shift requirement fixed at a timing close to each other, the shift control section is configured to permit switching between the neutral state and the drive mode, the foot pedal is constituted so as to allow a switching motion from a neutral position to an up side and a down side, and the shift control section permits switching from the drive mode to the neutral state by the foot operated shift control unit when the foot pedal is operated up and vehicle speed is equal to or below a predetermined vehicle speed.

* * * * *